W. LEWIS,
METHOD OF FORMING UNDERCUT SLOTS.
APPLICATION FILED FEB. 6, 1909.
1,014,658.
Patented Jan. 16, 1912.
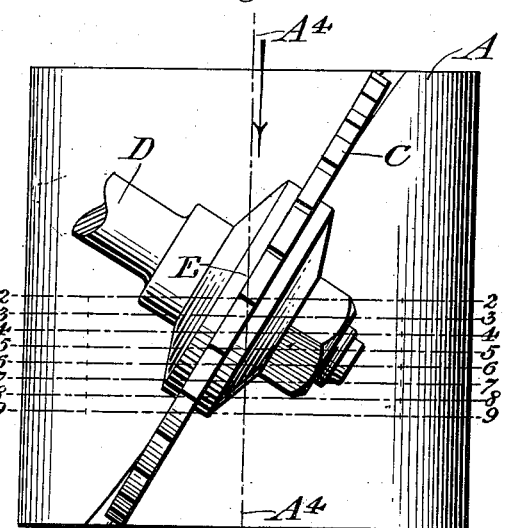
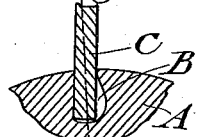
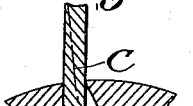
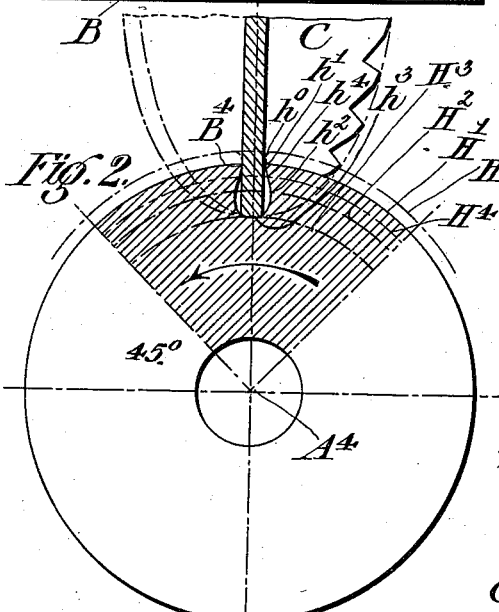
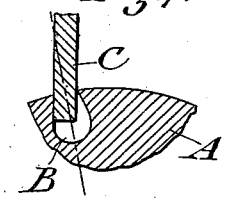
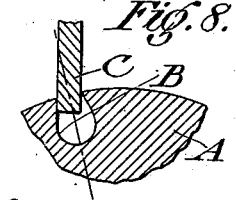
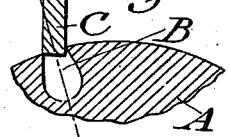
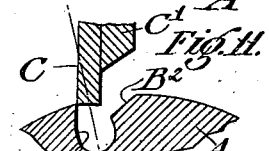
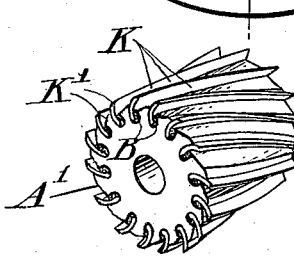
WITNESSES:
INVENTOR
BY
ATTORNEY.

UNITED STATES PATENT OFFICE.

WILFRED LEWIS, OF PHILADELPHIA, PENNSYLVANIA.

METHOD OF FORMING UNDERCUT SLOTS.

1,014,658. Specification of Letters Patent. Patented Jan. 16, 1912.

Application filed February 6 1909. Serial No. 476,383.

*To all whom it may concern:*

Be it known that I, WILFRED LEWIS, a citizen of the United States of America, residing in the city and county of Philadelphia, in the State of Pennsylvania, have invented a certain new and useful Improvement in Methods of Forming Undercut Slots, of which the following is a true and exact description, reference being had to the accompanying drawings, which form a part thereof.

The present invention relates to a method for forming undercut helical slots in a cylindrical body, such as the cutter holder of a milling cutter or the like having cutting teeth inserted in the cutter holder slots.

The object of the invention is the provision of a method by which slots may be expeditiously and properly formed and which may be carried out by means of simple and effective apparatus.

In carrying out the invention, I employ a saw as the slot cutter or shaper, and I form slots by carrying the saw through a helical path about the axis of the blank while preserving between the plane of the saw and the axis of the blank a certain definite angular relation, which depends on the pitch of the slot formed, the diameter of the blank, and the slot configuration which it is desired to produce. To facilitate a proper understanding of this relation and the manner in which the invention is carried out, reference may be had to the accompanying drawings, of which:

Figure 1 is a plan view showing the saw in the operative relation to the blank worked upon. Fig. 2 is an end elevation of the saw and blank shown in Fig. 1 with the saw and the cross hatched portion of the blank in section on the line 2—2 of Fig. 1. Figs. 3 to 9 inclusive are partial sectional elevations of the saw and blank taken on the lines 3—3 to 9—9 respectively of Fig. 1. Fig. 10 is a view similar to Fig. 9 showing the change in the slot configuration produced by increasing the diameter of the blank while preserving the other relations of Figs. 1 and 2. Fig. 11 is a view similar to Fig. 9 illustrating the use of an auxiliary saw portion to cut away one edge of the slot; and Fig. 12 is a perspective view of a rotary cutter formed by the use of the invention.

Referring to the drawings, A represents the cylindrical blank worked upon, B the slot being formed, and C a rotating saw carried by the horizontal arbor D. In practice, I prefer to obtain the necessary helical movement of the saw relative to the blank by moving the blank axially in the direction indicated by the arrow of Fig. 1, and rotating it in the direction indicated by the arrow of Fig. 2, while rotating the saw arbor D in stationary bearings. This relative bodily movement between the saw and the blank may be obtained in various ways, however. For instance, the blank may be maintained stationary while the saw is carried through the helical path, or the blank and the saw may each have appropriate movements imparted to them which unite to give the desired relative movement.

The successive sections shown in Figs. 2 to 9 inclusive show how the rear half of the saw undercuts the left side of groove B, and it will be readily understood that the front half of the saw in cutting into the blank undercuts the right half of the slot in a similar manner. To obtain the desired undercutting of the slot, it is essential that the saw should be maintained in a certain definite relation to the blank during the undercutting operation. To understand this relation, it must be remembered that each warped side surface of the helical slot B is made up of helical line elements and that the angle made by each of these line elements with an intersecting line parallel to the axis of the blank increases with the distance of the element from the axis of the blank. Similarly, the angle which any helical line element makes with a plane transverse to the axis of the blank, that is, the complement of the angle between the element and an intersecting line parallel to the axis of the blank, decreases with the distance of the element from the axis of the blank. Consequently, with any given setting of the blank, there is but one helical element which makes the same angle with a plane transverse to the axis of the blank as the angle between that plane and the plane of the saw. The particular line element which makes the same angle with a plane transverse to the axis of the blank as does the plane of the saw, I call the setting line of the saw.

In Fig. 2, the points $h^0$, $h'$, $h^2$, $h^3$ and $h^4$ represent helical line elements in the wall of the slot B intersecting the plane indicated in Fig. 1 by the line 2—2 at distances from the axis $A^4$ of the blank equal to the radii of the arcs indicated in Fig. 2 by $H^0$, $H'$, $H^2$, $H^3$ and $H^4$, respectively. The line indicated by $h^4$ is the setting line of the saw employed in carrying out the invention, as illustrated in the drawings. It is, of course, apparent that the setting line $h^4$ might be located at a different distance from the axis of the blank than that shown, but I have found that the best results are obtained by locating the setting line at about the distance from the axis of the blank indicated. To permit the use of a heavy saw for rapid cutting and at the same time to produce the greatest undercutting effect, the width of the slot at its narrowest point should be as near as possible to the width of the saw teeth. If a helical element in the periphery of the blank (line $h'$) is selected as the setting line, the slot cut will be wider than necessary, while by setting the saw to an element slightly within this periphery, more undercutting is obtained and the width of the slot is reduced. By setting the saw to a helical element still nearer to the center of the blank, as for instance line $h^2$, we come eventually to a position in which the saw begins to round over the outer edges of the slot, thus reducing its effective depth, the latter being obviously the distance from the bottom of the slot to its most contracted portion near or at the periphery of the blank. The rounding off of the outer edges of the slot, which occurs when the setting line is too far in from the periphery of the blank, is illustrated in Fig. 10, where the setting line is at the same distance from the axis of the blank as in the other figures of the drawings, but the blank itself is increased in size, so that its radius is the radius of the arc $H^0$ of Fig. 2 instead of the radius of the arc $H'$. Similarly, the effect of having the setting line too remote from the axis of the blank may be seen from Fig. 2, if we consider the character of the slot which would be formed if the blank radius were equal to the radius of arc $H^0$. The exact distance of the setting line from the axis of the blank depends upon a number of variables, such as the diameter of the blank, the depth of the slot, the diameter of the saw and the pitch of the helical slot. It cannot, therefore, be given exactly in terms of the depth of the slot, but in a general way it may be said that the setting line should be located at a distance from the axis of the blank equal to the radius of the blank less one-sixth of the depth of the slot.

In the milling cutter shown in Fig. 12, the inserted cutters K are anchored in place by soft metal fillings K' in slots B' formed in accordance with the present invention in a cutter holder A'. To give one concrete example illustrating the use of the invention, I may say that in a cutter of the kind shown in Fig. 12, which has been made having a nominal diameter of eight inches, the cutter holder blank A is seven and one-half inches in diameter, the slots B are each three-fourths of an inch deep, the maximum slot width is eleven-sixteenths of an inch, the slot width at the periphery of the blank is nine-sixteenth of an inch, and the setting line for the saw by which the slots were made, was located one-eighth of an inch within the periphery of the blank, that is, three and five-eighths inches from the axis of the blank.

The invention is capable of use for many different purposes, but was particularly designed for, and is particularly useful in, forming the slots in a cutter holder of a milling cutter such as is shown in Fig. 12. I make no claim herein, however, to the cutter shown in Fig. 12, as the features of novelty possessed by that tool are claimed in my co-pending application Serial Number 476,384 filed of even date herewith.

In practice, it is desirable to cut away the outer edge of each slot in front of each cutter blade, as indicated at $B^2$ in order to provide a proper clearance space for the chips cut by the blade and this cutting away may be accomplished at the same time that the slot is formed by a cutting portion formed integrally with or detachably connected to the saw, which undercuts the slot. For instance, in Fig. 11, I have illustrated an arrangement in which a saw blade C' is secured against the saw C for cutting away the slot wall at $B^2$ at the same time that the slot proper is formed. It will be understood, however, that the provision of the saw portion C' need not affect the arrangement or shape of the portion C of the saw which does the undercutting, and the sides of the saw portion C which does the undercutting may be described as plane and parallel. By this, I mean that if fed into stationary work in a direction transverse to the axis of the saw, the latter will cut a kerf having plane and parallel sides. In practice, I prefer to use a saw in which the cutting teeth are slightly wider than the body of the saw, and have cutting edges at their sides as well as at their edges most remote from the axis of the saw. Such cutting edges at the sides of the saw perform the function of side mills and avoid interference between the partially formed slot and the saw blade during the cutting process.

In the arrangement shown in Figs. 1 and 2 of the drawings, the center of the saw C is located directly above the axis $A^4$ of the blank, so that the prolongation of one radius of the saw would intersect at right angles with the blank axis, and this arrangement I prefer; but the setting of the saw need not be accurate in this respect, as a slight displacement of the saw in the direction of its axis of rotation is practically without effect upon the configuration of the slot produced.

Having now described my invention, what I claim as new and desire to secure by Letters Patent is:

1. The method of forming an undercut helical groove in a cylindrical blank, which consists in cutting a groove with a saw having its sides substantially plane and parallel, by moving the saw relative to the blank through a helical path about the axis of the blank while holding the saw relative to the blank so that the plane of the saw makes an angle with a plane transverse to the axis of the blank which is slightly more than the angle or inclination of a helical line in the side wall of the finished slot at the outer margin of the undercut portion of the slot.

2. The method of forming an undercut helical groove in a cylindrical blank, which consists in cutting a groove with a rotating saw having a radius greater than the depth of the groove by moving the saw in a helical path about the axis of the blank while maintaining the saw with one of its radii approximately normal to the surface of the blank and with its plane of rotation making an angle with a plane transverse to the axis of the blank which is slightly more than the angle or inclination of the edges of the slot.

WILFRED LEWIS.

Witnesses:
 ARNOLD KATZ,
 D. STEWART.

Copies of this patent may be obtained for five cents each, by addressing the "Commissioner of Patents, Washington, D. C."